US007356392B2

(12) United States Patent
Hubbard et al.

(10) Patent No.: US 7,356,392 B2
(45) Date of Patent: Apr. 8, 2008

(54) SYSTEM AND METHOD FOR EVALUATING VEHICLE AND OPERATOR PERFORMANCE

(75) Inventors: Jonathan Hubbard, San Francisco, CA (US); Christopher Kantarjiev, Palo Alto, CA (US); Robert Reid, Campbell, CA (US); Jonathan Tash, Tucson, AZ (US)

(73) Assignee: LandSonar, Inc., San Francisco, CA (US)

( * ) Notice: Subject to any disclaimer, the term of this patent is extended or adjusted under 35 U.S.C. 154(b) by 116 days.

(21) Appl. No.: 10/845,630

(22) Filed: May 13, 2004

(65) Prior Publication Data

US 2004/0254698 A1 Dec. 16, 2004

Related U.S. Application Data

(60) Provisional application No. 60/490,199, filed on Jul. 25, 2003, provisional application No. 60/471,021, filed on May 15, 2003.

(51) Int. Cl.
*G08G 1/017* (2006.01)
*G08G 1/123* (2006.01)
*G06F 17/00* (2006.01)

(52) U.S. Cl. .......................... 701/29; 701/35; 701/207; 701/213; 455/456.3; 340/905

(58) Field of Classification Search .................. 701/29, 701/35, 93, 207, 213; 455/456.3; 340/441, 340/995.1, 539.13; 705/9, 10, 11; 702/3
See application file for complete search history.

(56) References Cited

U.S. PATENT DOCUMENTS

| | | | | |
|---|---|---|---|---|
| 5,428,545 | A | 6/1995 | Maegawa et al. | |
| 5,465,079 | A | 11/1995 | Bouchard et al. | |
| 5,485,161 | A * | 1/1996 | Vaughn | 342/357.13 |
| 5,499,182 | A | 3/1996 | Ousborne | |
| 5,539,645 | A | 7/1996 | Mandhyan et al. | |
| 5,867,110 | A * | 2/1999 | Naito et al. | 340/286.05 |
| 5,908,464 | A | 6/1999 | Kishigami et al. | |
| 5,911,773 | A | 6/1999 | Mutsuga et al. | |
| 5,931,888 | A | 8/1999 | Hiyokawa | |
| 6,009,374 | A * | 12/1999 | Urahashi | 701/209 |
| 6,064,970 | A | 5/2000 | McMillan et al. | |
| 6,150,961 | A | 11/2000 | Alewine et al. | |
| 6,236,933 | B1 | 5/2001 | Lang | |
| 6,256,577 | B1 | 7/2001 | Graunke | |
| 6,282,486 | B1 | 8/2001 | Bates et al. | |
| 6,295,492 | B1 | 9/2001 | Lang et al. | |
| 6,317,686 | B1 | 11/2001 | Ran | |
| 6,353,795 | B1 | 3/2002 | Ranjan | |

(Continued)

OTHER PUBLICATIONS

Rockwell, Mark, "Telematic Speed Zone Ahead," Wireless Week, Jun. 15, 2004, Reed Business Information, http://www.wirelessweek.com.

*Primary Examiner*—Tan Q. Nguyen
(74) *Attorney, Agent, or Firm*—Carr & Ferrell LLP

(57) ABSTRACT

The present invention relates to the field of safety management of one or more vehicles, and more particularly, to a system and method for analyzing information relating to a vehicle's performance characteristics such as speed against environmental attributes such as speed limits to assess a vehicle and operator's tendency to operate according to preset or other criteria.

25 Claims, 6 Drawing Sheets

U.S. PATENT DOCUMENTS

| | | | | |
|---|---|---|---|---|
| 6,466,862 | B1 | 10/2002 | DeKock et al. | |
| 6,473,000 | B1 * | 10/2002 | Secreet et al. | 340/936 |
| 6,556,905 | B1 * | 4/2003 | Mittelsteadt et al. | 701/35 |
| 6,574,548 | B2 | 6/2003 | DeKock et al. | |
| 6,584,400 | B2 | 6/2003 | Beardsworth | |
| 6,594,576 | B2 | 7/2003 | Fan et al. | |
| 6,675,085 | B2 * | 1/2004 | Straub | 701/93 |
| 6,720,889 | B2 * | 4/2004 | Yamaki et al. | 340/933 |
| 6,728,605 | B2 | 4/2004 | Lash et al. | |
| 6,785,606 | B2 | 8/2004 | DeKock et al. | |
| 6,914,541 | B1 * | 7/2005 | Zierden | 340/937 |
| 6,931,309 | B2 * | 8/2005 | Phelan et al. | 701/1 |
| 6,987,964 | B2 * | 1/2006 | Obradovich et al. | 455/414.1 |
| 2001/0018628 | A1 | 8/2001 | Jenkins et al. | |
| 2003/0135304 | A1 | 7/2003 | Sroub et al. | |

* cited by examiner

FLEET SUMMARY REPORT

Acme Distributing, Inc.

Fleet Speed Safety Report

Start Date: 6/15/03 12:00AM  Fleet Location: San Francisco, Calif.

End Date: 6/16/03 12:00AM  Requested By: T. Jameson

Speed Criteria:

20% above speed limit, minimum 10 MPH

Minimum duration: 10 seconds

| Vehicle ID | Driver ID | % of Route Speeding | % of Streets Speeding | Average Speed | Highest Speed (Freeway) | Highest Speed (City Streets) | Most Serious Incident: Speed | Most Serious Incident: Posted Speed Limit | Most Serious Incident: Location |
|---|---|---|---|---|---|---|---|---|---|
| | | | | | | | | | *** |
| Fleet Average | *** | 31% | 19% | 39 | 64 | 52 | *** | *** | *** |
| 664 | A. Jackson | 45% | 24% | 44 | 77 | 62 | 62 | 30 | 1700 Harrison, San Francisco, CA |
| 407 | G. Apple | 38% | 22% | 41 | 65 | 53 | 36 | 25 | 1600 Folsom, San Francisco, CA |
| 981 | R. Reid | 35% | 19% | 45 | 72 | 62 | 35 | 25 | Route 101, San Francisco, CA |
| 903 | J. Hubbard | 35% | 19% | 45 | 72 | 62 | 35 | 20 | Route 101, San Francisco, CA |
| 840 | F. Gupta | 31% | 28% | 38 | 64 | 52 | 42 | 30 | San Pablo Ave, Emeryville, CA |
| 333 | T. Swartz | 31% | 26% | 38 | 64 | 52 | 42 | 30 | El Camino, Menlo Park, CA |
| 588 | D. Strong | 30% | 15% | 39 | 62 | 45 | 58 | 25 | 1700 Harrison, San Francisco, CA |
| 214 | R. Hill | 30% | 15% | 39 | 62 | 45 | 58 | 30 | I-880, Fremont, CA |
| 682 | K. Vlad | 28% | 18% | 36 | 63 | 52 | 33 | 25 | El Camino, Menlo Park, CA |
| 272 | A. Lions | 26% | 16% | 37 | 61 | 45 | ** | ** | ** |
| 789 | W. Queen | 26% | 16% | 37 | 61 | 45 | ** | ** | ** |

402 404 406 408 410 412 414

FIGURE 4

Single-Driver Speed Incident Map

502

SYSTEM AND METHOD FOR EVALUATING VEHICLE AND OPERATOR PERFORMANCE

CROSS-REFERENCE TO RELATED APPLICATIONS

The present application claims the priority benefit of U.S. Provisional Patent Application No. 60/471,021 entitled "Method and System for Evaluating Performance of a Vehicle and/or Operator" filed May 15, 2003 and U.S. Provisional Patent Application No. 60/490,199 entitled "System and Method for Determining and Sending Recommended Departure Time Based on Predicted Traffic Conditions to Road Travelers" filed Jul. 25, 2003. The disclosures of these commonly owned and assigned applications are incorporated by reference.

BACKGROUND OF THE INVENTION

1. Field of the Invention

The present invention relates generally to the field of safety management of one or more vehicles, and more particularly, to analyzing information relating to a vehicle's performance characteristics against map database attributes to assess a vehicle's tendency to operate according to a set of criteria.

2. Description of Related Art

The American trucking industry employs nearly ten million people. This includes more than 3 million truck drivers who travel over 400 billion miles per year to deliver to Americans 87% of their transported food, clothing, finished products, raw materials, and other items. Trucks are the only providers of goods to 75 percent of American communities, and for many people and businesses located in towns and cities across the United States, trucking services are the only available means to ship goods. As five percent of the United States' Gross Domestic Product is created by truck transportation, actions that affect the trucking industry's ability to move its annual 8.9 billion tons of freight have significant consequences for the ability of every American to do their job well and to enjoy a high quality of life.

With the importance of the American trucking industry in mind, it is unfortunate that workers in the American trucking industry experience the most fatalities of all occupations, accounting for twelve percent of all American worker deaths. Approximately two-thirds of fatally injured truckers are involved in highway crashes. Roughly 475,000 large trucks are involved in crashes that result in approximately 5,360 fatalities and 142,000 injuries each year. Of these fatalities, about seventy-four percent are occupants of other vehicles (usually passenger cars), three percent are pedestrians, and twenty-three percent are occupants of large trucks. As there was a twenty-nine percent increase between the years of 1990 and 2000 in the number of registered large trucks and a forty-one percent increase in miles traveled by large trucks, it is evident that the risks involved in the trucking industry are not simply going to go away. If anything, this increase in trucks on the road and miles traveled evidences that the $3 billion in lost productivity to the economy and hundreds of millions of dollars in insurance premiums caused by truck crashes may get even worse.

Studies and data indicate that driver errors and unacceptable driver behaviors are the primary causes of, or primary contributing factors to, truck-involved crashes. The Federal Motor Carrier Safety Administration reports that speeding (i.e., exceeding the speed limit or driving too fast for conditions) is a contributing factor in twenty-two percent of fatal crashes involving a truck in 2000. Additionally, National Highway Traffic Safety Administration reports that speeding is a contributing factor in twenty-nine percent of all fatal crashes in 2000. More than 12,000 people lost their lives in 2000 in part due to speed-related crashes.

With the pressure of making on-time deliveries, many drivers are willing to accept the risks of unsafe driving in order to achieve timely arrivals. Unfortunately, the primary tool for preventing unsafe driving—law enforcement—can only be present in so many places at so many times. Even when law enforcement is present, drivers can communicate with one another to inform them of 'speed traps' or other locales where law enforcement presence is high. While drivers may engage in ultra-safe driving in these areas, it does not change the fact that a vast majority of the time these drivers are on the road, they are not subject to any type of third-party supervision or accountability with regard to their driving habits. Thus, additional oversight of driver behavior is required.

Although causes of crashes are largely human, important solutions may be found in technology to facilitate and augment driver performance. For example, to minimize these costs, conventional telemetric safety solutions are used to observe and measure vehicle tendencies and patterns for improving safety. Generally, these solutions are binary in nature in that they are limited to generating simple triggering alarms, such as whether a particular characteristic is within an acceptable tolerance (e.g., whether a vehicle's speed is in compliance with a pre-set maximum authorized speed).

Such binary solutions offer only temporary notice (e.g., an audible alarm) to the driver that they are engaged in unsafe driving behavior and when that behavior abates (e.g., the cessation of the alarm). These solutions do not provide an indication of long-term or habitual unsafe driving behavior and can easily be 'muted' or otherwise disabled by the driver whereby any value offered by such an alarm solution is eliminated. These binary solutions, too, often do not inform another party, such as a fleet manager, of such unsafe driving behavior as the driver alone hears the alarm and is made aware of the unsafe behavior.

High-grade digital mapping systems offering detailed, digital models of the American highway, road, and street networks and developed for the consumer in-vehicle navigation market have provided an opportunity to combine map data with vehicle operation and location data to offer innovative software based services and solutions. Presently available digital map databases, such as those provided by NAVTEQ, can include up to 150 individual road attributes as well as individual points of interest, localities, and addresses. Continuing developments in map database technology allow for allocation of even more attributes to segments of road data including speed limit, school and construction zone information, car pool lane limitations including persons, and hours of operation, prohibitions on turns (e.g., no right turn on red between 6-9 AM), and so forth.

In the transportation industry, managers of trucking fleets worry about their vehicles and drivers speeding on arterial and surface streets as well as in highway construction zones in addition to violating other traffic ordinances. Not only does such behavior put employees and third-parties at risk, but it is also directly proportional to the costs of insurance premiums that result in an increase in the price of transportation services that trickle-down to customers benefiting from delivery services. Being able to monitor and address unsafe driving behavior would result in a decrease of these incidents and a decrease in insurance costs.

There presently exists no user-friendly mechanism and or analytic tools for measuring a vehicle's and or a driver's performance given geographic and environmental contexts of that vehicle in determining whether that vehicle or driver is operating outside a margin of safety.

SUMMARY OF THE INVENTION

The present invention provides a system and method for analyzing certain vector and operational data received from a vehicle in the form of vehicle data against map data from a database, which includes certain road segment attributes. This analysis allows a user to assess tendencies of a vehicle or its operator to operate in an unsafe manner according to criteria defined by the user.

In an exemplary embodiment, a method provides a software-based service that combines data collected by GPS receivers in vehicles with road speed-limit information from data repositories, which can include data representing high-grade digitized maps (including graphical descriptions and geographic context characteristics describing environs of a segment of a road) in order to monitor drivers for excessive speed. This service is an easy-to-deploy method of predicting and identifying accident-prone drivers before accidents happen thereby providing fleet managers and safety experts from the insurance industry, among others, with a relatively easy-to-use and low-cost tool for improving safety management.

BRIEF DESCRIPTION OF THE DRAWINGS

FIG. 4 illustrates an exemplary tabular format for reporting analyzed vehicle data in accordance with an exemplary embodiment of the present invention.

SUMMARY OF THE INVENTION

Figure 1:
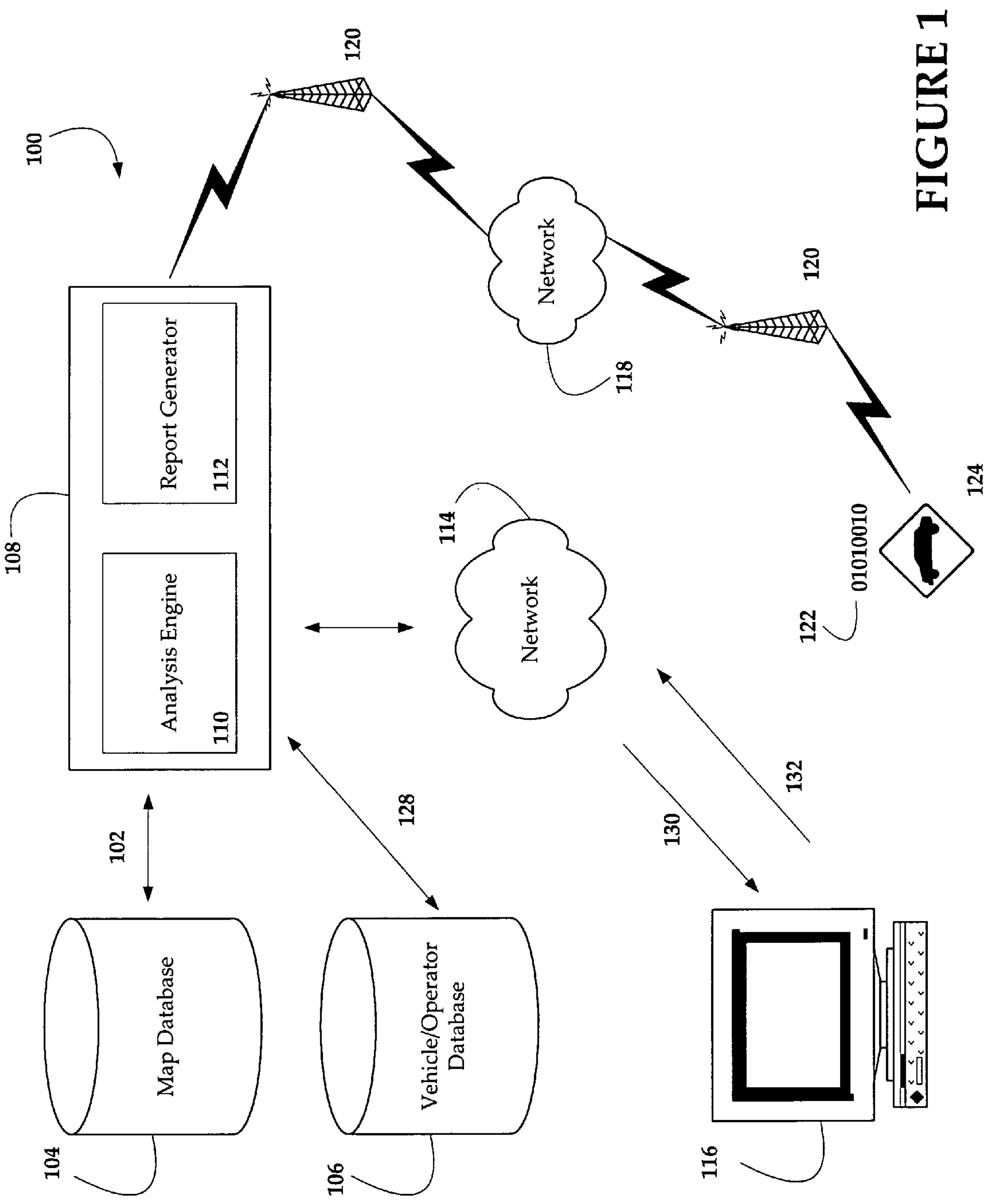
FIG. 1 is an exemplary system in accordance with one embodiment of the present invention.

Detailed descriptions of exemplary embodiments are provided herein. It is to be understood, however, that the present invention may be embodied in various forms. Therefore, specific details disclosed herein are not to be interpreted as limiting, but rather as a basis for claims and as a representative basis for teaching one skilled in the art to employ the present invention in virtually any appropriately detailed system, structure, method, process, or manner.

In accordance with one embodiment of the present invention, a system and method analyzes vehicle operational data, vector data, and location data, for example, in conjunction with information from a map database to allow a user to assess whether a vehicle is being operated in a potentially dangerous manner. Such a determination can be made by ranking or rating different drivers and or vehicles according to their propensity for potentially dangerous operation as determined by analyzing specific sets or subsets of data representing a driver's or a vehicle's performance.

User inputs can define how to evaluate different drivers and or vehicles using vehicle attribute data (e.g., weight, width, height, length, number of axles, load type, number, and types of occupants) and time period or trips over which driver or vehicle should be evaluated. Each of these different drivers can be identified with an operator identifier, which is associated with one or more vehicle identifiers. For example, a driver having Operator ID number 1453 can be associated with truck numbers T1, T4, T15, and T2. Hence, the Operator 1453's driving behavior can be evaluated over each of the vehicles (i.e., T1, T4, T15, and T22) that the driver operates.

As described herein, vehicle data is comprised of vector data and operational data. Vector data includes positional information (e.g., x-y-z coordinates determined from GPS information, such as longitude, latitude, and elevation over sea-level), velocity information (e.g., speed, and acceleration) and any other information derived from positional-determination means as determined by, for example, a GPS receiver. Operational data includes information relating to operational parameters of the vehicle such as centrifugal force (as measured in 'G's'), rotational engine speed (as measured in 'RPMs'), torque, oil temperature, tire pressure readings, or any other sensor-generated data.

The vector and operational data received from these vehicles in the form of vehicle data can be collected in real-time and/or at some point in time where data is 'batched' or downloaded at certain intervals of time (e.g., data is downloaded from a fleet vehicle after returning to a fleet base station via infra-red or any other communication medium). This vehicle data is then relayed to a computer for analysis in comparison and/or contrast to map information (e.g., road segments and road segment attributes in a map database). The present invention also envisions a system wherein analysis of vehicle data against map information occurs in real-time wherein the computer and/or database are on-board with the vehicle generating relevant vehicle data.

The matching vehicle data (e.g., vehicle speed or vehicle weight) and the road segment attribute information (e.g., speed limit or vehicle weight restriction) are analyzed to determine how the vehicle's operation compares to a set of user-defined safety criteria, for example, a set of characteristics entered by the user to generate a report. The system and method can then rate and rank operators and or vehicles according to their propensity to violate predetermined rules set by the user (e.g., a fleet manager).

In accordance with a specific embodiment, vehicle data can be collected and/or inferred (e.g., derived) from data collected by various types of sensors including in-vehicle GPS receivers, vehicle speedometer, and/or through external inference, such as cell phone, satellite triangulation, or by other known means.

An exemplary method and system in accordance with the present invention can use a map database containing road segments and road segment attribute information. Roads (or any other thoroughfare) are stored as data in the map database and can be represented as a collection of road segments. Each road segment in the database will be associated with road segment attributes that provide information about a specific road segment such as road type, speed limit, vehicle weight, and/or height restriction, turn restrictions, and so forth.

DETAILED DESCRIPTION

FIG. 1 illustrates an exemplary evaluation system 100. A processor 108 of evaluation system 100 is configured to receive vehicle data 122 from a vehicle 124 via any one of relay 120 and network 118. The processor 108 of evaluation system 100 is configured to exchange map data 102 with map database 104 as well as to exchange vehicle/operator data 128 with vehicle/operator database 106. The processor 108 is also configured to deliver evaluation information 130 to a client 116 via local network 114 in response to a client request 132.

Vehicle 124 can be any type of automobile, truck, or other conveyance such as a water-traversing vehicle. Vehicle 124 generally includes a position and or direction-determining device, such as a Global Positioning System (GPS) receiver, and can include additional hardware and/or software for generating, transmitting, and/or receiving data, such as vector or operational data. While one skilled in the art will appreciate exact operational details of GPS, at a more fundamental level, GPS is a navigation system that provides specially coded satellite signals that can be processed in a GPS receiver enabling the receiver to compute position, velocity, and time. The present invention envisions alternative embodiments wherein other position and/or direction-determining devices (e.g., Dead Reckoning from Qualcomm), are utilized for generating, transmitting, and/or receiving data, such as vector or operational data.

In one embodiment, at least a portion of the hardware and or software residing, in part, within vehicle 124 can function in a manner similar to DriveRight manufactured by Davis Instruments. DriveRight, and products like it, provide an on-board display console for viewing time, distance, top speed, and average speed. In particular, a portion of the hardware operates as a data port from which vector and or operational data can be retrieved for transmittal from vehicle 124 to processor 108 in the form of vehicle data 122.

While present products like DriveRight do not take into account geographic data, such as map data from a map database, these products do use vector and/or operational data from the vehicle's own instruments through the vehicle's On-Board Diagnostic system ("OBD")—a computer-based system built into all model year 1996 and newer cars and trucks that monitors performance of the vehicle's major components and emission controls—as well as various unsafe operation sensors to to prepare vehicle data 122.

This vehicle vector and/or operation data generated by GPS receiver and/or other resident hardware and/or software is transmitted in the form of vehicle data 122 to processor 108 for generating analytical reports in accordance with the present invention. In an exemplary embodiment, vehicle data 122 is any form of machine-readable data reflecting vehicle vector data and/or operational data such as velocity, position, RPMs, oil temperature, and so forth. Other hardware embodiments for generating vehicle vector and/or operation data can include industry-standard telemetric hardware such as @Road's FleetASAP or Qualcomm's OmniTRACS. OmniTRACS computes position by measuring the round trip delay of synchronized transmissions from two geostationary satellites separated by 12-24 degrees. The network management at the OmniTRACS hub computes the range of each satellite and derives the third measurement needed for position from a topographic model of the earth. These various hardware and/or software embodiments can be implemented at the vehicle 124 and/or remotely in evaluation system 100 as is most appropriate per design of the particular embodiment.

Relay 120 can be any relay station for receiving and transmitting signals between a vehicle 124 and a processor 108 of evaluation system 100, such as an antenna, cellular phone tower, or any other transmission tower using known or future wireless protocols. Network 118 can be any communications network known in the art configured to transport signals between the relay 120 and the processor 108 of evaluation system 100 such as the Internet or proprietary wireless networks. In some embodiments, relay 120 can be replaced with satellites or any other suitable equivalents for operation with the adapted network 118 for communicating vehicle data 122 between the processor 108 and the vehicle 124.

An exemplary evaluation system 100 includes, at least, the map database 104, the vehicle/operator database 106, and the processor 108 comprising analysis engine 110 and report generator 112. Map database 104 and vehicle/operator database 106 can include any data structure adapted for storage and access as generated in accordance with exemplary methods of the present invention, and can include optical storage media such as CD-ROM, non-volatile memory such as flash cards, or more traditional storage structures such as a computer hard drive.

Map database 104 is configured to store and to provide map data 102. Map data includes road segments and road segment attributes as defined by a user. Such road segment attributes can include a posted speed limit, maximum vehicle weight, road type (e.g., two-way traffic, paved, etc.), height restriction, turn restriction (e.g., no right on red during certain time periods), and so forth. Road segment attributes are limited only by an ability to identify a particular segment of road—a road segment—with some sort of empirical data or other statistical limitation such as a speed limit.

For example, consider a road passing from point A through point B to point C, where the posted speed transitions from 35 mph to 55 mph at point B. The portion of the road between points A and B is a first road segment, and similarly, the portion between point B and C is a second road segment. Road segment attributes '35 mph' and '55 mph' are associated with the related road segments and are analyzed to determine whether a driver has exceeded the posted speed limit over the road from point A to point C.

Vehicle/operator database 106 is configured to store and to provide vehicle/operator data 128. Vehicle/operator data 128 can comprise weight, width, height, length, number of axles, load type, number and types of occupants for a particular vehicle as well as speeds traveled by a particular vehicle at various times during its scheduled deliveries. Vehicle/operator data 128, as it pertains to a vehicle, is limited only to the extent that it is some identifiable information about a particular vehicle. Vehicle/operator data 128 can also include data for a particular operator or driver such as a 'name,' a 'driver identifier,' or 'employee number.' Like vehicle/operator data 128 relating to a vehicle, such data is limited as it pertains to a driver to the extent that it need only be information about a particular driver. Vehicle/operator database 106 also stores long-term statistical information (e.g., vehicle/operator data 128) describing one or more vehicles' and/or operators' vector, operational, and location data over an extended period of time.

Processor 108 comprises the analysis engine 110 and report generator 112. Processor 108, analysis engine 110, and report generator 112 are configured to allow access to network 118, map database 104, and vehicle/operator database 106. Processor 108 is further configured to allow access by client 116. Access configuration, in the case of the client 116, can optionally occur via network 114. Network 114 can be a local area network or a wide-area network. More traditional means of access configuration to client 116 may include a bus. Any means of allowing client 116 access to processor 108 is acceptable in the present invention.

The exemplary processor 108 can be any computing device known in the art, such as a server, central computer, or the like. Processor 108 is able to process instructions from, at least, analysis engine 110 and report generator 112 in addition to client 116. Processor 108 also may interact with map database 104 and vehicle/operator database 106 to the extent it is necessary to retrieve map data 102 and/or vehicle/operator data 128, and to store new data to the databases 104 and 106. Processor 108 may also receive vehicle data 122 from network 118 and or/relays 120 and to request certain data from a vehicle 124 via the same means.

Analysis engine 110 and report generator 112 can comprise hardware, software, or a combination thereof. Analysis engine 110 and report generator 112 may or may not be in a common housing dependent on the nature of processor 108. Some embodiments may configure analysis engine 110 and report generator 112 on multiple processors 108 to allow for reduced workload on any single processor 108 or to provide for redundancy as to allow for fault tolerance. Any configuration is acceptable in the present invention so long as analysis engine 110 and report generator 112 are able to interact with various elements of the present invention, namely the processor 108, to carry out their allocated responsibilities.

Analysis engine 110 and report generator 112 manage the analysis and report generation process, respectively, in accordance with an embodiment of the present invention. Client 116, in turn, can be any variety of personal computers, workstations, or other access devices such as a personal digital assistant (e.g., a Palm Handheld from Palm, Inc. or the Blackberry from Research in Motion). Client 116 need only be able to provide the necessary input to access processor 108 and output provided by processor 108.

Analysis engine 110, specifically, is the software and or hardware that manages the analysis of data retrieved from the vehicle/operator database 106 and map database 104 in response to queries from a user entering input via client 116. Such an analysis can include any Boolean and or logical, arithmetic, mathematical, or other operation for comparing data.

For instance, if a fleet manager wishes to determine the performance, in terms of speed, of each driver in a fleet of vehicles over a particular road segment, the fleet manager may input driver IDs and a road segment identifier related to that road segment via client 116. Analysis engine 110 causes the processor 108 to fetch map data 102 from the map database 104 representing, at least, posted speed information (i.e., a road segment attribute) for that road segment (e.g., a 45 mph speed limit for a specific stretch of city street). Analysis engine 110 may also instruct processor 108 to fetch vehicle/operator data 128 for a particular group of drivers reflecting their average and maximum speed traveled over the particular road segment of interest from vehicle/operator database 106.

Figure 5:
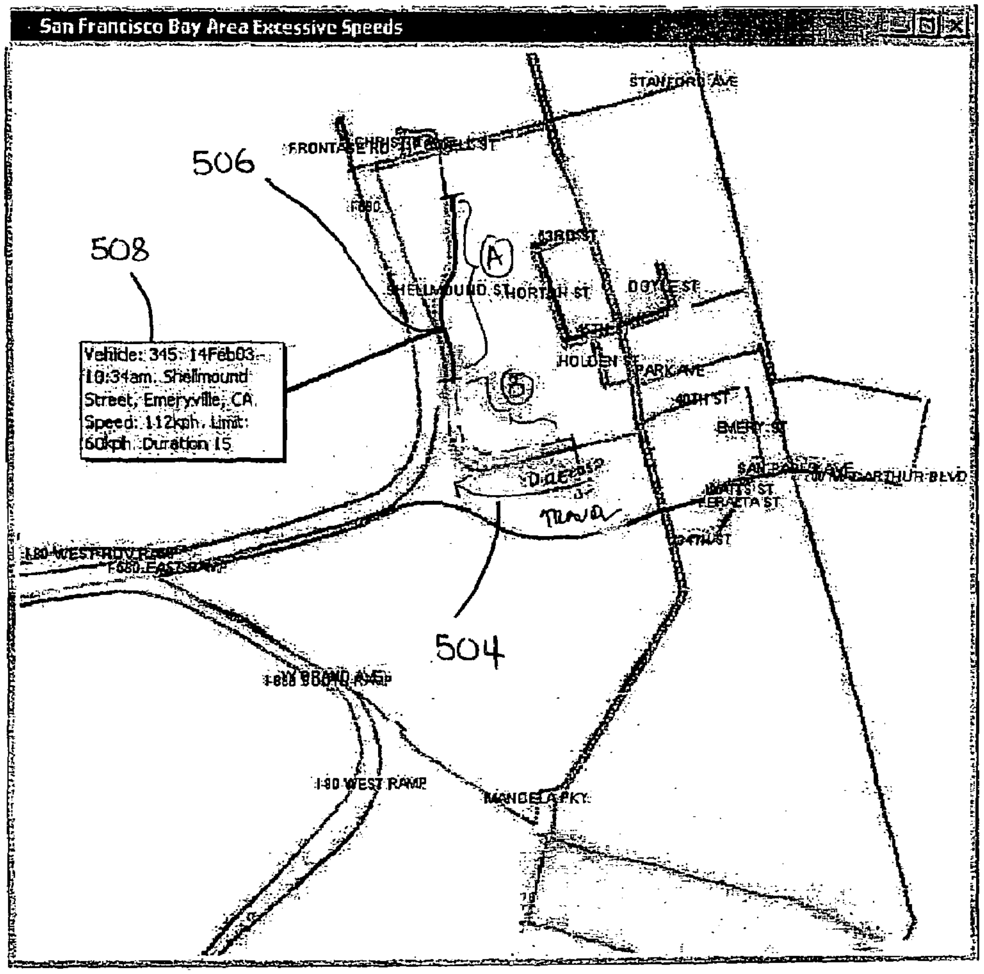
FIG. 5 illustrates another exemplary format for graphically reporting analyzed vehicle data in accordance with an exemplary embodiment of the present invention.

If, following analysis by analysis engine 110, the vehicle/operator data 128 for a particular driver indicates driving behavior exceeding the posted limit for a particular road segment as identified by map data 102, an indication is generated. This indication is included in a report generated by report generator 112. Report generator 112 is the software and/or hardware that creates and distributes reports according to criteria set by a user. FIGS. 4 and 5 illustrate exemplary report formats embodying representations of some of the map data 102 and vehicle/operator data 128 gathered by evaluation system 100. This report is delivered to client 116 in the form of evaluation information 130. Evaluation information 130 is machine-readable data that can be reconstructed by client 116 in a form recognizable and understandable to the user such as exemplified in FIGS. 4 and 5. Reconstruction of evaluation information 130 can be manipulated as to depend on the particular type of user interface being utilized in client 116.

Delivery of evaluation information 130 as prepared by analysis engine 110 and report generator 112 to client 116 can occur through a point-to-point link such as a bus or any type of network 114 such as a local area network (an Intranet) or a wide-area network 114 (e.g., a wireless network, the Internet, or a large-scale, closed proprietary network).

An alternative embodiment of the present invention provides for processor 108, analysis engine 110, report generator 112, and map database 104 to be located entirely within a vehicle 124 so that driver may be notified in real-time as to whether the driver is violating any particular road segment attribute such as speed limit.

Figure 2A:
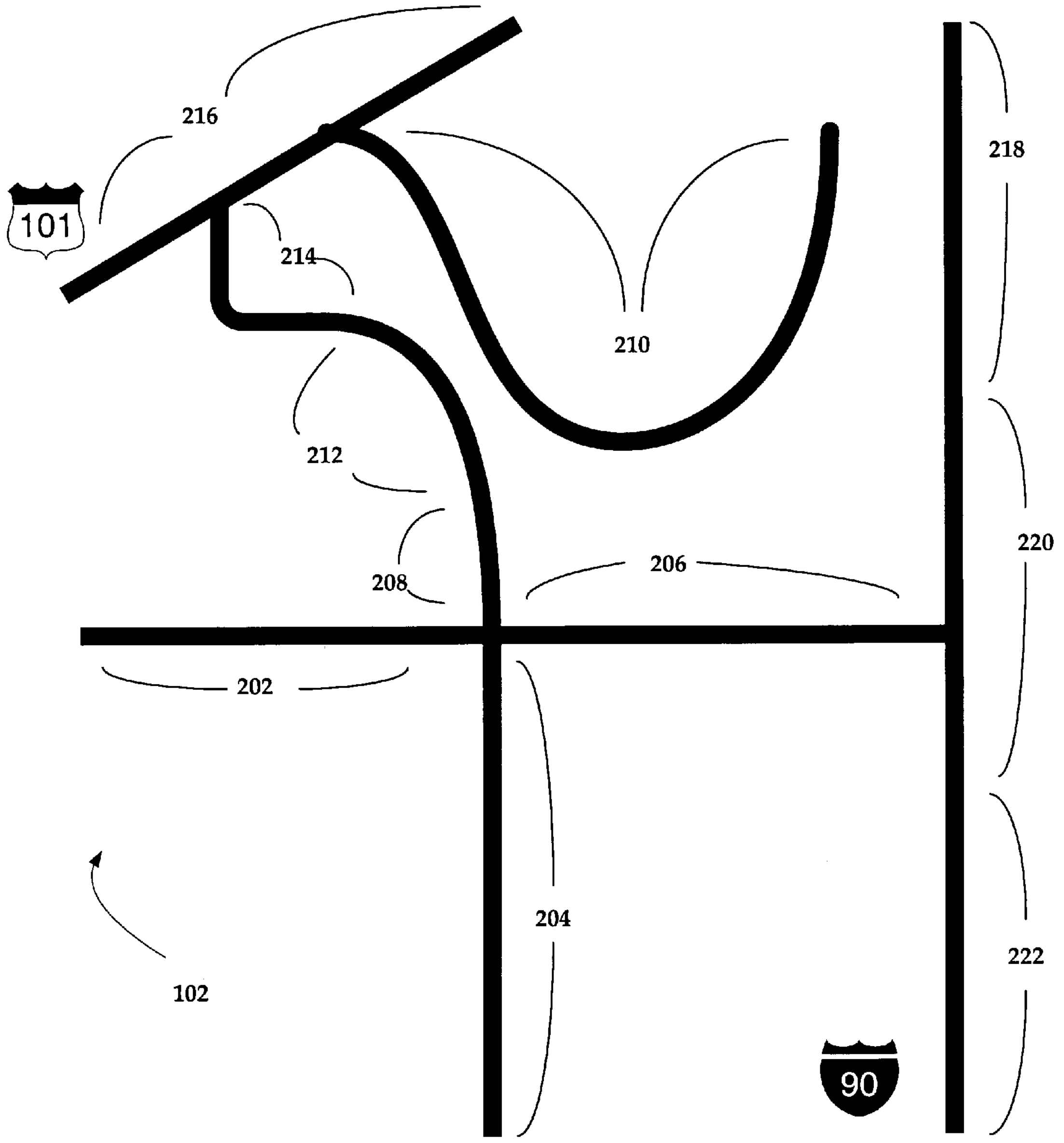
FIG. 2A is an exemplary representation of map data reflecting existence of various road segments.

FIG. 2A is an exemplary embodiment of map data 102 as retrieved from map database 104 (FIG. 1). Map data 102 is comprised of road segments 202, 204, 206, 208, 210, 212, 214, 216, 218, 220, and 222. Road segments are identifiable portions of road or highway. Road segments can comprise, for example, a city block or a particular stretch of highway between two mile markers. Road segments can also comprise portions of road or highway with particular or unique features such as a particular road surface (e.g., pavement or gravel), zones (e.g., school or construction), or lane limitations (e.g., no right turn on red or carpool lanes).

Road segment attributes are associated with the aforementioned road segments 202-222. Road segments attributes are identifiable features of a particular road segment such as a posted speed limit, hours of limited operation, weight restrictions, specific traffic regulations, hazardous cargo requirements, and so forth. One road segment can have multiple road segment attributes. For example, one road segment (like a highway) can have a road segment attribute pertaining to speed limit and another road segment attribute as to hazardous cargo limitations.

Road segment attributes can be standard information about a particular road segment as might be provided by a commercial digital map producer such as car pool lane information or speed limits. A user can also assign specific road segment attributes through input provided by client 116 (FIG. 1) and stored in map database 104 by the processor 108 for later access and reference.

Figure 2B:
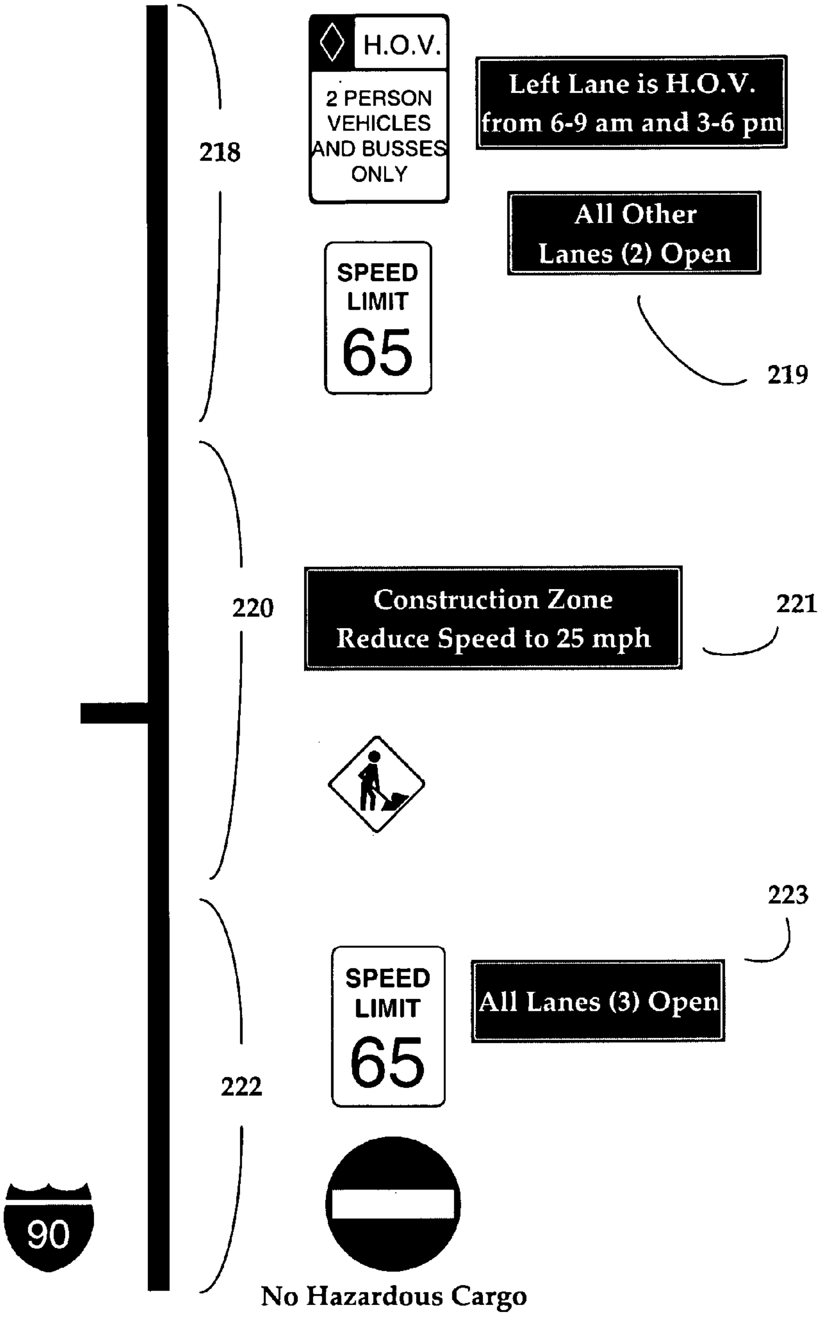
FIG. 2B is a detailed view of road segments of FIG. 2A wherein particular road segment attributes are shown.

FIG. 2B is a detailed view of certain road segments from FIG. 2, in particular, road segments 218, 220, and 222 and their related road segment attributes 219, 221, and 223.

For example, road segment 218 is a particular stretch of highway. This segment of the highway, however, is subject to a 65 mph speed limit and the existence of a car pool lane whereby only passenger vehicles with 2 or persons are allowed to travel in the car pool lane between the hours of 6 and 9 AM and 3 and 6 PM. These limitations-speed limit and car pool lane hours-are the road segment attributes 219 for road segment 218.

Road segment 220 has its own unique set of road segment attributes 221. In this case, a particular stretch of highway has no carpool lane limitations—all three lanes are open to all forms of traffic—but there is presently construction on this stretch of highway whereby the speed limit is reduced to 25 mph. The non-existence of a carpool lane and the construction zone speed limit are the road segment attributes 221 for this particular highway segment.

By further example, road segment 222 has a 65 mph speed limit, 3 lanes, and a hazardous cargo prohibition. The speed limit, lane information, and cargo prohibition are the road segment attributes 223 for this particular road segment 222.

A user of client 116 (FIG. 1) can access the processor 108 and request map data 102 (FIG. 1) from map database 104 (FIG. 1). In particular, the user can request data for road segment 218 and its related road segment attributes 219. User can then query vehicle/operator database 106 (FIG. 1) for the driving information of a particular vehicle and its operator on road segment 218 on a particular date and at a particular time. Analysis engine 110 (FIG. 1) can then determine that the particular driver happened to be driving a commercial vehicle in the carpool lane at 4.45 PM (as is prohibited and noted in road segment attribute 219) wherein an indication would be generated. Report generator 112 (FIG. 1) will then report the existence of this indication to client 116 in the form of evaluation information 130 (FIG. 1). User can then, after review of the evaluation information 130, determine whether any sort of warning need be provided to the driver.

If the vehicle/operator data 128 (FIG. 1) as stored in vehicle/operator database 106 reflects an ongoing trend of violating local traffic ordinances, this indication will also be generated by analysis engine 110 and reported by report generator 112 in the form of evaluation information 130 to the user. The user can then determine whether any sort of disciplinary action—such as termination of the driver's employment—need be taken.

This type of information would, in the absence of the present invention, be unavailable without the issuance of a citation by local law enforcement or reporting of an illegal traffic behavior by a concerned motorist to a customer complaint line as is often offered through 'How am I Driving?' report lines advertised on backs of commercial trucking units.

Figure 3:
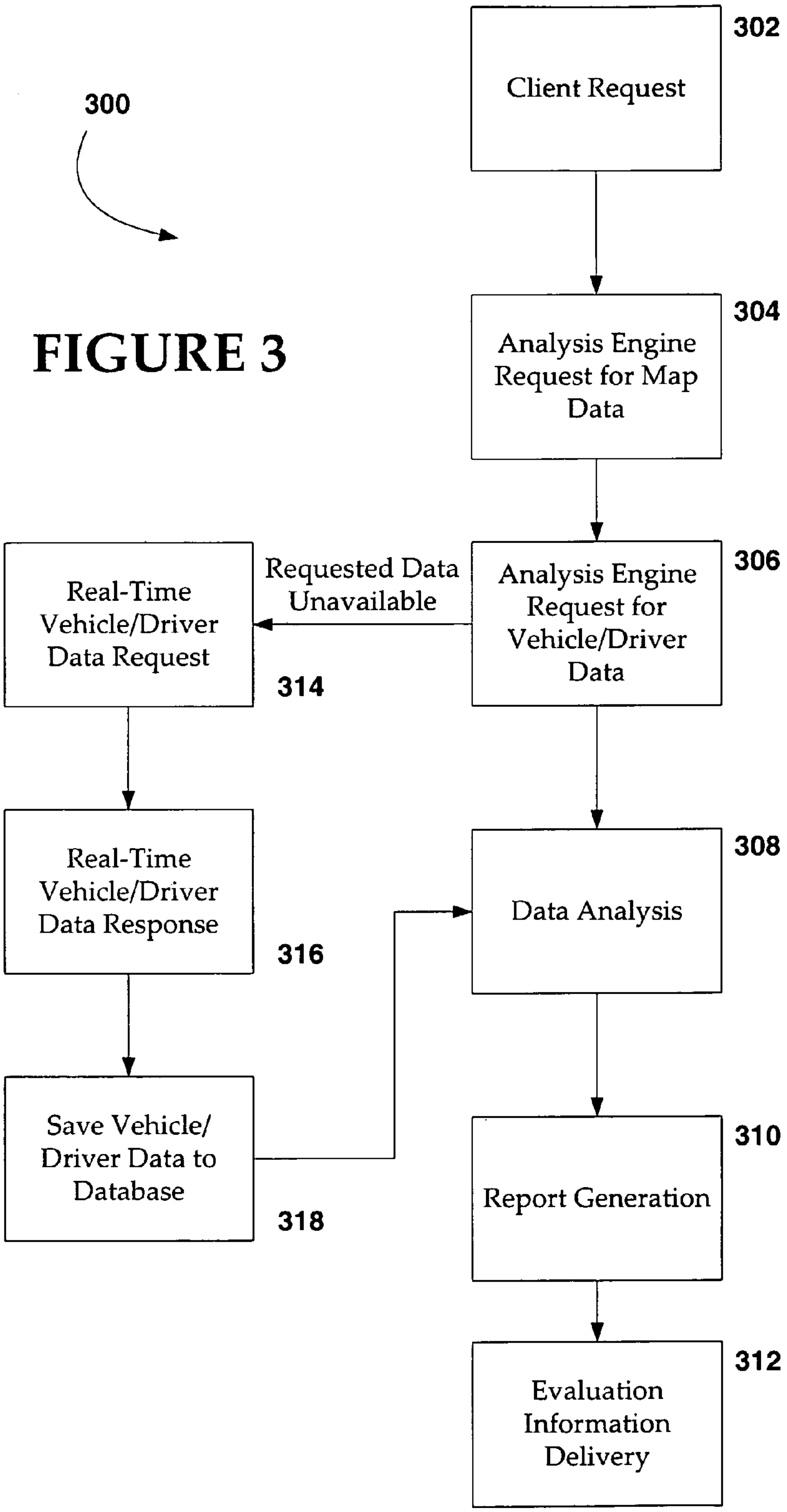
FIG. 3 is a flow chart representing an exemplary method of evaluating vehicle and or operator performance.

An exemplary method for evaluating vehicle and/or operator performance is shown in FIG. 3. The evaluation method 300 is initiated by a client request 302 from a user of the client 116 (FIG. 1). The client request 302 is initiated with an intention of receiving evaluation information to perform an evaluation of a vehicle and/or driver's performance. The client request 302 can comprise any number of variables including information concerning a particular driver, a particular vehicle, a particular time of day, or a particular route. The request can include real-time information or a historical record of information as well as performance over a particular road segment or with regard to particular road segment attributes.

In response to a client request 302, the analysis engine 110 (FIG. 1) will make a map data request 304 via processor 108. Map data request 304 will request specific map data 102 (FIG. 1) from a map database 104 (FIG. 1) in accordance with the variables of client request 302. The map data 102 retrieved from map database 104 in response to map data request 304 is determined by the scope of the aforementioned client request 302 and can include, for example, as little as data pertaining to a particular road segment 202 (FIG. 2A) or a larger return of data, for example, all road segments exhibiting a particular road segment attribute 223 (FIG. 2B).

Analysis engine 110 also makes a vehicle/operator data request 306 via processor 108 of the vehicle/operator database 106 (FIG. 1) seeking particular vehicle/operator data 128. The vehicle/operator data request 306 is made in accordance with the variables of the client request 302. The vehicle/operator data 128 retrieved from vehicle/operator database 106 is determined by the scope of the aforementioned client request 302 and can include, for example, as little as data pertaining to a particular vehicle/driver on one day or a larger return of data, for example, a vehicle/driver's performance over several weeks.

Retrieval of data from map database 104 and vehicle operator database 106 by the processor 108 on behalf of the analysis engine 110 in response to a client request 302 can occur serially or in parallel. The present invention is not limited by one field of data being retrieved prior to the second.

Upon retrieval of data by the processor 108 on behalf of an analysis engine 110, analysis engine 110 will perform an analysis of the various fields of data 308 in accordance with the client request 302. This analysis 308 can include any Boolean and/or logical, arithmetic, mathematical, or other operation for comparing data in response to the client request 302.

Following an analysis 308, the report generator 112 will take the analyzed data and any indications to generate a report 310. The report is generated in accordance with criteria set by the user in its client request 302. Such a report can include, for example, a particular driver's highest speed along a particular route or a particular driver's time spent traveling above the posted speed limit (speeding) for a particular road segment. The scope of the report generated 310 by a report generator 112 is limited only by the scope of the client request 302 and the available data in a map and vehicle/operator database.

Following generation of a driver/vehicle report, evaluation information 130, often in the form of a chart or graph, is delivered 312 by the processor 108 on behalf of the report generator 112 to the user making the initial client request 302. Examples of evaluation information are exemplified in FIGS. 4 and 5.

The method also allows for retrieval of real-time vehicle/operator information concerning a particular vehicle or driver that may not be immediately available in vehicle/operator database 106. There can exist instances where the processor 108 is unable to retrieve the data requested by an analysis engine 110 because the vehicle/operator data 128 is in real-time and/or has not yet been transmitted to the processor 108 and/or stored in the vehicle/operator database 106. In these instances, the processor 108, on behalf of analysis engine 110, can make a real-time request 314 to a particular vehicle 124 (FIG. 1) via any number of relays 120 (FIG. 1) and or network 118 (FIG. 1) as is necessary. Upon receiving this request, the operative data-collecting component in vehicle 124 will deliver the requested vehicle data 122 via a real-time response 316 through any number of relays 120 and or network 118, as is necessary, to the processor 108 and analysis engine 110.

Processor 108 can, either serially or in parallel, store the newly received data from the real-time response 316 via a storage step 318 as it is being analyzed 308 by an analysis engine 110. Completion of the evaluation method 300 would then continue via report generation 310 and delivery of evaluation information 312.

FIG. 4 illustrates a representative format for reporting, in a table, analyzed map and vehicle/operator data in accordance one embodiment of the present invention. In this exemplary Fleet Summary Report 402, a fleet manager can quickly determine a rank of each of the drivers in a fleet. This report draws the fleet manager's attention to potential problematic drivers who may need closer supervision or training. Exemplary rankings include: percentage of route speeding (404); percentage of streets speeding (406); average speed (408); highest speed on a freeway (410); highest speed on city streets (412); most significant speed related incident (414); and other criterion defined by a user.

FIG. 5 illustrates another representative format for graphically reporting analyzed map and vehicle/operator data in accordance with one embodiment of the present invention. The exemplary Graphical Fleet Summary Report 502 shown in FIG. 5 is designed to draw attention to potentially dangerous incidents. This report 502 graphically presents a detailed path of a vehicle 504, and uses colors or any other visual representation to highlight driver incidents 506. When the user places a computer mouse over the path 504 a window 508 appears giving detailed information on the corresponding incident 506. For example, after obeying the speed limit over segment B (e.g., hence no indications to the contrary), the driver over segment A is shown to be traveling at 112 kph in a 60 kph zone for that road segment. A user utilizing the evaluation method exemplified in FIG. 3 can obtain this information in real-time or post-transmission.

By utilizing the exemplary reports of FIGS. 4 and 5 or any other report generated by the system a fleet supervisor can get a comparative overview of all his drivers according to criteria (pre-set or otherwise). This driver ranking report can then be used to highlight those drivers most in need of closer supervision or training. Insurance companies can encourage their fleet manager clients to use the system and method to lower loss ratios or, in other words, reduces crashes and save lives.

In addition to the report outlined in FIGS. 4 and 5, other delivery formats such as e-mail-based reports can be used to provide information to a user.

In some embodiments, known probabilistic approaches can be applied to predict a vehicle's or an operator's future tendencies because embodiments of the present invention overcomes the shortcomings in data quality that traditional binary approaches cannot. Importantly, exemplary methods described herein assess the "geographic context" to telemetric reporting by taking into account, for example, changing speed limit information. In other embodiments, specific weather/construction conditions relating to a specific road segment is considered in the calculus of ranking drivers (e.g., whether it was raining at, or in the vicinity of, a specific road segment, where such meteorological data is retrieved from other databases containing such information).

One having ordinary skill in the art should appreciate that the methodologies discussed herein take into account that sensor error occurs and underlying map attribute data may be outdated or erroneous (e.g., a speed limit may be been changed). In some embodiments, these errors are detected or accommodated by the system via manual updates to the map database 104 (e.g., a new batch of map information introduced via a CD-ROM or entered manually by hand) or, in some embodiments, by data reported by the driver of a vehicle 124 during transmission of vehicle data 122, which can include data pertaining to new or changed road segment attributes. Some map databases 104 might be connected to an outside network (not shown) to automatically obtain new map data 102 via an Internet connection to a third-party server providing regularly updated map data 102.

Additionally, more than one type of underlying map database 104 can used to adapt to differences in sets of map data 102 and be used to test the effect of map quality on the report results as maps from some providers contain more attribute error than others.

In some embodiments, a database can be used to provide information regarding trip time, location, weather, congestion, road construction, types of cargo, etc. to refine the data collected to generate more meaningful reports. That said, an exemplary report in accordance with the present invention could highlight specific incidents and can have a strong deterrent effect and discourage irresponsible driving habits when used by a fleet manager as part of a safety program.

In other embodiments, additional report elements outlined above can further include inferred vector versus reported vector. Most in-vehicle GPS receivers calculate and record speed but some only record latitude and longitude. The present invention may infer latitude and longitude from speed.

The above description is illustrative and not restrictive. Many variations of the present invention will become apparent to those of skill in the art upon review of this disclosure. The scope of the present invention should, therefore, be determined not with reference to the above description, but instead should be determined with reference to the appended claims along with their full scope of equivalents.

What is claimed is:

1. A system for evaluating performance of an operator of a vehicle, the system comprising:

a map database configured to provide map data, wherein the map data comprises a plurality of thoroughfares, at least one of the plurality of thoroughfares including a plurality of road segments and wherein at least one road segment is associated with at least one road segment attribute;

a vehicle/operator database configured to provide vehicle and operator data, wherein the vehicle data includes information acquired during operation of the vehicle and the operator data identifies an operator of the vehicle during vehicle operation, the vehicle and operator data encompassing an entire instance of vehicle operation by the operator;

an analysis engine configured to analyze data from the map database, the map data including the at least one road segment attribute associated with the at least one road segment with respect to the provided vehicle and operator data, the vehicle and operator of the vehicle having traversed the at least one road segment, the analysis engine further configured to generate an indication of operator performance of the vehicle with respect to the at least one road segment and the at least one road segment attribute associated with the at least one road segment, wherein the operator, the at least one road segment and the at least one road segment attribute are identified as part of a user request; and a report generator configured to generate evaluation information in accordance with the indication generated by the analysis engine, the evaluation information indicating performance of the operator with respect to the at least one road segment and the associated at least one road segment attribute identified by the user request, the evaluation information indicating performance over a time period identified by the user request.

2. The system of claim 1 further comprising a client device for making the user request for evaluation information from the report generator, and wherein the report generator is further configured to deliver the user requested evaluation information to the client device.

3. The system of claim 2, wherein vehicle data includes data generated at the vehicle and transmitted via at least one relay and a network to the vehicle/operator database in real time, wherein the at least one relay includes a satellite and the network includes a proprietary network.

4. The system of claim 2, wherein vehicle data includes data generated at the vehicle and transmitted via at least one relay and a network to the vehicle/operator database at a certain interval of time, wherein the at least one relay includes a satellite and the network includes a proprietary network.

5. The system of claim 1, wherein the user request further identifies another operator and the analysis engine is further configured to generate an indication of operator performance of the vehicle for the another operator with respect to the at least one road segment and the at least one road segment attribute associated with the at least one road segment, and wherein the report generator is further configured to rank the operator and the another operator with respect to operation of a series of vehicles and with respect to the at least one road segment and the associated at least one road segment attribute over the time period identified by the user request.

6. The system of claim 5, wherein the operator and the another operator are ranked according to a propensity to violate a predetermined rule associate with the at least one road segment attribute associated with the at least one road segment.

7. The system of claim 6, wherein the report generator provides the ranked evaluation information as part of report displaying the violated predetermined rule and a number of time that the predetermined rule was violated over the time period identified by the user request.

8. The system of claim 1, wherein the analysis engine is further configured to predict future performance of the operator based on a trend for the operator identified over the time period identified by the user request.

9. The system of claim 1, wherein the analysis engine is further configured to request real-time vehicle data from the vehicle operated by the operator of the vehicle if the vehicle data is not presently available in the vehicle/operator database.

10. The system of claim 1, wherein e analysis engine is further configured to request a batch of vehicle data from the vehicle operated by the operator at a regular interval.

11. The system of claim 1, wherein the report generator is further configured to display the evaluation information as part of a map based report indicating a violated predetermined rule, the time and date the predetermined rule was violated, and a location of the violation of the predetermined rule on the map.

12. The system of claim 1, wherein the evaluation engine is further configured to indicate performance of the operator with respect to operation of a series of vehicles.

13. A method for evaluating performance of a vehicle operator, the method comprising:

retrieving map data from a map database, wherein the map data comprises a plurality of thoroughfares, at least one of the plurality of thoroughfares including a plurality of road segments and wherein at least one road segment is associated with at least one road segment attribute;

retrieving vehicle data and vehicle operator data from a vehicle/operator database, wherein the vehicle data includes information acquired during operation of the vehicle and the operator data identifies an operator of the vehicle during vehicle operation, the vehicle and operator data encompassing an entire instance of vehicle operation by the operator;

analyzing the vehicle data and vehicle operator data against the map data, the map data including the at least one road segment attribute associated with the at least one road segment with respect to the provided vehicle and operator data, the vehicle and operator of the vehicle having traversed the at least one road segment;

generating an indication of operator performance of the vehicle with respect to the at least one road segment and the at least one road segment attribute associated with the at least one road segment, wherein the operator, the at least one road segment and the at least one road segment attribute are identified as part of a user request;

generating evaluation information in accordance with the generated indication, the evaluation information indicating performance of the operator with respect to the at least one road segment and the associated at least one road segment attribute identified by the user request, the evaluation information indicating performance over a time period identified by the user request; and delivering the evaluation information to a client device in response to the user request.

14. The method of claim 13 further comprising receiving vehicle data generated at the vehicle to the vehicle/operator database in real time, wherein the real-time vehicle data is added to the vehicle/operator database for subsequent analysis against the map data.

15. The method of claim 13, further comprising:

receiving an identification of another operator in a user request and generating an indication of operator performance of the vehicle for the another operator with respect to the at least one road segment and the at least one road segment attribute associated with the at least one road segment; and ranking the operator and the another operator with respect to operation of a series of vehicles and with respect to the at least one road segment and the associated at least one road segment attribute over the time period identified by the user request.

16. The method of claim 15, wherein the operator and the another operator are ranked according to a propensity to violate a predetermined rule associate with the at least one road segment attribute associated with the at least one road segment.

17. The method of claim 13, further comprising predicting future performance of the operator based on a trend for the operator identified over the time period identified by the user request.

18. The method of claim 13, wherein the evaluation information further includes an indication of performance of the operator with respect to operation of a series of vehicles.

19. A method for evaluating performance of an operator of a vehicle, the method comprising:

receiving vehicle data at a vehicle/operator database, the vehicle data including information acquired during operation of the vehicle, the vehicle data being associated with operator data that identifies an operator of the vehicle during vehicle operation, the vehicle and operator data encompassing an entire instance of vehicle operation by the operator;

retrieving map data from a map database, wherein the map data comprises a plurality of thoroughfares, at least one of the plurality of thoroughfares including a plurality of road segments and wherein at least one road segment is associated with at least one road segment attribute;

analyzing the vehicle data and vehicle operator data against the map data, the map data including the at least one road segment attribute associated with the at least one road segment with respect to the provided vehicle and operator data, the vehicle and operator of the vehicle having traversed the at least one road segment;

generating an indication of operator performance of the vehicle with respect to the at least one road segment and the at least one road segment attribute associated with the at least one road segment, wherein the operator of the vehicle, the at least one road segment and the at least one road segment attribute are identified as part of a user request;

generating evaluation information in accordance with the generated indication, the evaluation information indicating performance of the operator and another operator with respect to the at least one road segment and the associated at least one road segment attribute identified by the user request, the evaluation information indicating performance over a time period identified by the user request; and delivering the evaluation information to a client device in response to the user request, wherein the evaluation information ranks the operator against the other operator with respect to a propensity to violate a predetermined rule associated with the at least one road segment attribute associated with the at least one road segment.

20. A method for evaluating performance of the operator of a vehicle, the method comprising:

retrieving map data from a map database, wherein the map data comprises a plurality of thoroughfares, at least one of the plurality of thoroughfares including a plurality of road segments and wherein at least one road segment is associated with at least one road segment attribute;

attempting to retrieve vehicle and operator data from a vehicle/operator database, wherein the vehicle data includes information acquired during operation of the vehicle and the operator data identifies an operator of the vehicle during vehicle operation, the vehicle and operator having been identified as part of a user request, the vehicle and operator data encompassing an entire instance of vehicle operation by the operator;

determining that the vehicle/operator database does not include the vehicle data corresponding to the entire instance of vehicle operation by the operator identified as a part of the user request;

requesting vehicle data from the vehicle in real-time, the vehicle corresponding to the vehicle identified as a part of the user requests, wherein the identified operator is currently operating the identified vehicle;

storing the vehicle data at the vehicle/operator database, the vehicle data having been received in response to the request for the vehicle data;

analyzing the vehicle data and vehicle operator data against the map data in real-time, the map data including the at least one road segment attribute associated with the at least one road segment with respect to the provided vehicle and operator data, the vehicle and operator of the vehicle having traversed the at least one road segment;

generating an indication of operator performance of the vehicle with respect to the at least one road segment and the at least one road segment attribute associated with the at least one road segment, wherein the operator of the vehicle, the at least one road segment and the at least one road segment attribute are identified as part of a user request;

generating evaluation information in accordance with the generated indication, the evaluation information indicating performance of the operator with respect to the at least one road segment and the associated at least one road segment attribute identified by the user request, the evaluation information indicating performance over a time period identified by the user request; and delivering the evaluation information to a client device in response to the user request.

21. The method of claim 20, wherein the evaluation information ranks the operator against another operator with respect to a propensity to violate a predetermined rule associate with the at least one road segment attribute associated with the at least one road segment.

22. A system for evaluating performance of an operator of a vehicle, the system comprising:

means for providing map data, wherein the map data comprises a plurality of thoroughfares, at least one of the plurality of thoroughfares including a plurality of road segments and wherein at least one road segment is associated with at least one road segment attribute;

means for providing vehicle and operator data, wherein the vehicle data includes information acquired during operation of the vehicle and the operator data identifies an operator of the vehicle during vehicle operation, the vehicle and operator data encompassing an entire instance of vehicle operation by the operator;

means for analyzing map data, the map data including the at least one road segment attribute associated with the at least one road segment with respect to the provided vehicle and operator data, the vehicle and operator of the vehicle having traversed the at least one road segment, the means for analyzing further configured to generate an indication of operator performance of the vehicle with respect to the at least one road segment and the at least one road segment attribute associated with the at least one road segment, wherein the operator, the at least one road segment and the at least one road segment attribute are identified as part of a user request; and means for generating evaluation information in accordance with the indication generated by the means for analyzing, the evaluation information indicating performance of the operator with respect to the at least one road segment and the associated at least one road segment attribute identified by the user request, the evaluation information indicating performance over a time period identified by the user request.

23. A computer-readable storage medium having embodied thereon a computer program, the program being executable by a processor to perform a method for evaluating performance of a vehicle operator, the method comprising:

retrieving map data from a map database, wherein the map data comprises a plurality of thoroughfares, at least one of the plurality of thoroughfares including a plurality of road segments and wherein at least one road segment is associated with at least one road segment attribute;

retrieving vehicle data and vehicle operator data from a vehicle/operator database, wherein the vehicle data includes information acquired during operation of the vehicle and the operator data identifies an operator of the vehicle during vehicle operation, the vehicle and operator data encompassing an entire instance of vehicle operation by the operator;

analyzing the vehicle data and, vehicle operator data against the map data, the map data including the at least one road segment attribute associated with the at least one road segment with respect to the provided vehicle and operator data, the vehicle and operator of the vehicle having traversed the at least one road segment;

generating an indication of operator performance of the vehicle with respect to the at least one road segment and the at least one road segment attribute associated with the at least one road segment, wherein the operator, the at least one road segment and the at least one road segment attribute are identified as part of a user request;

generating evaluation information in accordance with the generated indication, the evaluation information indicating performance of the operator with respect to the at least one road segment and the associated at least one road segment attribute identified by the user request, the evaluation information indicating performance over a time period identified by the user request; and delivering the evaluation information to a client device in response to the user request.

24. A computer-readable storage medium having embodied thereon a program, the program being executable by a processor to perform a method for evaluating performance of an operator of a vehicle, the method comprising:

receiving vehicle data at a vehicle/operator database, the vehicle data including information acquired during operation of the vehicle; the vehicle data being associated with operator data that identifies an operator of the vehicle during vehicle operation, the vehicle and operator data encompassing an entire instance of vehicle operation by the operator;

retrieving map data from a map database, wherein the map data comprises a plurality of thoroughfares, at least one of the plurality of thoroughfares including a plurality of road segments and wherein at least one road segment is associated with at least one road segment attribute;

analyzing the vehicle data and vehicle operator data against the map data, the map data including the at least one road segment attribute associated with the at least one road segment with respect to the provided vehicle and operator data, the vehicle and operator of the vehicle having traversed the at least one road segment;

generating an indication of operator performance of the vehicle with respect to the at least one road segment and the at least one road segment attribute associated with the at least one road segment, wherein the operator of the vehicle, the at least one road segment and the at least one road segment attribute are identified as part of a user request;

generating evaluation information in accordance with the generated indication, the evaluation information indicating performance of the operator and another operator with respect to the at least one road segment and the associated at least one road segment attribute identified by the user request, the evaluation information indicating performance over a time period identified by the user request; and delivering the evaluation information to a client device in response to the user request, wherein the evaluation information ranks the operator against the other operator with respect to a propensity to violate a predetermined rule associate with the at least one road segment attribute associated with the at least one road segment.

25. A computer-readable storage medium having embodied thereon a program, the program being executable by a processor to perform a method for evaluating performance of the operator of a vehicle, the method comprising:

retrieving map data from a map database, wherein the map data comprises a plurality of thoroughfares, at least one of the plurality of thoroughfares including a plurality of road segments and wherein at least one road segment is associated with at least one road segment attribute;

attempting to retrieve vehicle and operator data from a vehicle/operator database, wherein the vehicle data includes information acquired during operation of the vehicle and the operator data identifies an operator of the vehicle during vehicle operation, the vehicle and operator having been identified as part of a user request, the vehicle and operator data encompassing an entire instance of vehicle operation by the operator;

determining that the vehicle/operator database does not include the vehicle data corresponding to the entire instance of vehicle operation by the operator identified as a part of the user request;

requesting vehicle data from the vehicle in real-time, the vehicle corresponding to the vehicle identified as a part of the user request, wherein the identified operator is currently operating the identified vehicle;

storing the vehicle data at the vehicle/operator database, the vehicle data having been received in response to the request for the vehicle data;

analyzing the vehicle data and vehicle operator data against the map data in real-time, the map data including the at least one road segment attribute associated with the at least one road segment with respect to the provided vehicle and operator data, the vehicle and operator of the vehicle having traversed the at least one road segment;

generating an indication of operation performance of the vehicle with respect to the at least one road segment and the at least one road segment attribute associated with the at least one road segment, wherein the operator of the vehicle, the at least one road segment and the at least one road segment attribute are identified as part of a user request;

generating evaluation information in accordance with the generated indication, the evaluation information indicating performance of the operator with respect to the at least one road segment and the associated at least one road segment attribute identified by the user request, the evaluation information indicating performance over a time period identified by the user request; and delivering the evaluation information to a client device in response to the user request.

* * * * *